United States Patent [19]
Naruse

[11] Patent Number: 5,325,431
[45] Date of Patent: Jun. 28, 1994

[54] LOOKING AND LISTENING FEE COLLECTION SYSTEM FOR PAY BROADCASTING

[75] Inventor: Kazuaki Naruse, Toda, Japan

[73] Assignee: Kabushiki Kaisha Toshiba, Kawasaki, Japan

[21] Appl. No.: 953,793

[22] Filed: Sep. 30, 1992

[30] Foreign Application Priority Data

Sep. 30, 1991 [JP] Japan .................. 3-250695

[51] Int. Cl.⁵ .................. H04N 7/167; G06F 7/08
[52] U.S. Cl. .................. 380/16; 380/10; 380/19; 380/20; 380/23; 235/380; 235/381; 235/382
[58] Field of Search .................. 380/6, 7, 9, 10, 16, 380/19, 23, 20; 235/380, 381, 382, 382.5

[56] References Cited
U.S. PATENT DOCUMENTS

| | | | |
|---|---|---|---|
| 4,809,325 | 2/1989 | Hayashi et al. | 380/20 |
| 4,833,710 | 5/1989 | Hirashima | 380/20 |
| 4,973,828 | 11/1990 | Naruse et al. | 235/380 |
| 4,975,951 | 12/1990 | Bennett | 380/20 |

*Primary Examiner*—Bernarr E. Gregory
*Attorney, Agent, or Firm*—Cushman, Darby & Cushman

[57] ABSTRACT

A looking and listening fee collection system for satellite broadcasting of this invention is designed to collect looking and listening fees for satellite broadcasting by using balances prestored in an IC card. More specifically, looking and listening fee information and a scrambled broadcast signal of a pay broadcast are received. The received scrambled broadcast signal is descrambled. The broadcast corresponding to the descrambled broadcast signal is televised on a TV receiver. An IC card reader/writer receives the IC card in which a monetary value is stored, and reads/updates the monetary value stored in the IC card. When a pay broadcast is televised by the TV receiver, the IC card reader/writer is used to update the monetary value stored in the IC card to a monetary value obtained by subtracting the looking and listening fee for the pay broadcast from the monetary value stored in the IC card. With this system, looking and listening fees for satellite broadcasting can be collected in units of programs or on a time basis.

17 Claims, 11 Drawing Sheets

| | |
|---|---|
| KEY INFORMATION | ~13a |
| LOOKING AND LISTENING INFORMATION | ~13b |
| CONTRACT INFORMATION | ~13c |
| COMMON BALANCE/ UPDATE DATE | ~13d |
| A COMPANY INDIVIDUAL BALANCE/UPDATE DATE | ~13e |
| B COMPANY INDIVIDUAL BALANCE/UPDATE DATE | ~13f |
| C COMPANY INDIVIDUAL BALANCE/UPDATE DATE | ~13g |
| D COMPANY INDIVIDUAL BALANCE/UPDATE DATE | ~13h |
| ARARM AMOUNT | ~13i |

LOOKING AND LISTENING FEE COLLECTION SYSTEM FOR PAY BROADCASTING

BACKGROUND OF THE INVENTION

Field of the Invention

The present invention relates to a looking and listening fee collection system for toll broadcasting, which is designed to collect looking and listening fees for, e.g., satellite broadcasting by using an IC card.

Description of the Related Art

As one of pay broadcasting systems, a looking and listening system by means of satellite broadcasting has recently been put into practice. In such a satellite broadcasting looking and listening system, only subscribers can watch a broadcast from a satellite broadcasting company, since they have decoder for descrambling (decoding) a scrambled broadcast signal.

In this system, a fixed amount scheme is employed, in which fixed monthly looking and listening fees are paid in units of stations. Some subscribers enjoy many hours of programs broadcast white others enjoy less hours thereof. It would therefore be unfair that every subscriber pays the same fee.

So that, demands have arisen for a toll scheme in which looking and listening fees are paid in units of programs or on a time basis.

SUMMARY OF THE INVENTION

It is an object of the present invention to provide a looking and listening fee collection system for pay broad-casting, which can collect looking and listening fees for pay broadcasting in units of programs or on a time basis.

It is another object of the present invention to provide a looking and listening fee collection system for pay broadcasting, which allows each of a plurality of broadcasting stations to collect looking and listening fees for pay broadcasting in units of programs or on a time basis.

It is still another object of the present invention to provide a looking and listening fee collection system for pay broadcasting, which can collect looking and listening fees for pay broadcasting from an IC card to which a monetary value is given.

It is still another object of the present invention to provide a looking and listening fee collection system for pay broadcasting, in which an IC card to which a monetary value commonly used for a plurality of broadcasting stations, and an individual monetary value used for each broadcasting station are given is prepared so that if one monetary value is used up, a looking and listening fee for pay broadcasting can be collected from the other monetary value.

It is still another object of the present invention to provide a looking and listening fee collection system for pay broadcasting, in which processing required to watch a program is performed by using an IC card to prevent a non-subscriber from illegally watching the program by means of alteration of a decoder or the like.

It is still an object of the present invention to provide a looking and listening fee collection system for pay broadcasting, in which when the balance of an IC card is updated, its amount limit and valid term are checked so that illegal or unauthorized use of the IC card by a third person can be prevented.

It is still another object of the present invention to provide a looking and listening fee collection system for pay broadcasting, in which when the balance of an IC card is reduced to a certain degree, a warning can be given to a subscriber before he/she becomes unable to watch a broadcast, thereby achieving an improvement in serviceability.

According to the present invention, there is provided a system for collecting a looking and listening fee for pay broadcasting by using an IC card, the system comprising means for receiving looking and listening fee information and scrambled audio-video information, both sent from a station, means for descrambling the audio-video information received by the receiving means, means for outputting the descrambled audio-video information descrambled by the descrambling means, and an IC card including means for storing balance information of a prepaid fee, and means for updating the balance information stored in the storing means on the basis of the looking and listening fee information received by the receiving means.

According to the present invention, there is provided a system for collecting a looking and listening fee for pay broadcasting by using an IC card, the system comprising means for receiving looking and listening fee information and scrambled audio-video information, both sent from a station means for descrambling the audio-video information received by the receiving means, means for outputting the descrambled audio-video information descrambled by the descrambling means, and an IC card including first storing means for storing balance data of the prepaid fee used for an individual broadcasting station, second storing means for storing balance data of the prepaid fee used commonly for broadcasting stations, and updating means for updating the balance data in one of the first and second storing means on the basis of the looking and listening fee information received by the means.

According to the present invention, there is provided a system for updating the balance stored in an IC card for collecting a looking and listening fee for pay broadcasting, the system comprising an IC card including first storing means for storing balance data of a prepaid fee for an individual broadcasting station, second storing means for storing balance data of a prepaid fee used commonly for broadcasting stations, and third storing means for storing limit amounts of the balances of the prepaid fees stored in the first and second storing means, an updating device including means for selecting a broadcasting station, the balance for which is updated, means for setting an amount to be added to the current balance, means for comparing the limit amount with the sum of the current balance and the amount to be added, and means for setting the sum as an updated amount when the comparing means has determined that the sum is less than the limit amount.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A satellite broadcasting system according to an embodiment of the present invention will be described below with reference to the accompanying drawings.

Figure 1:
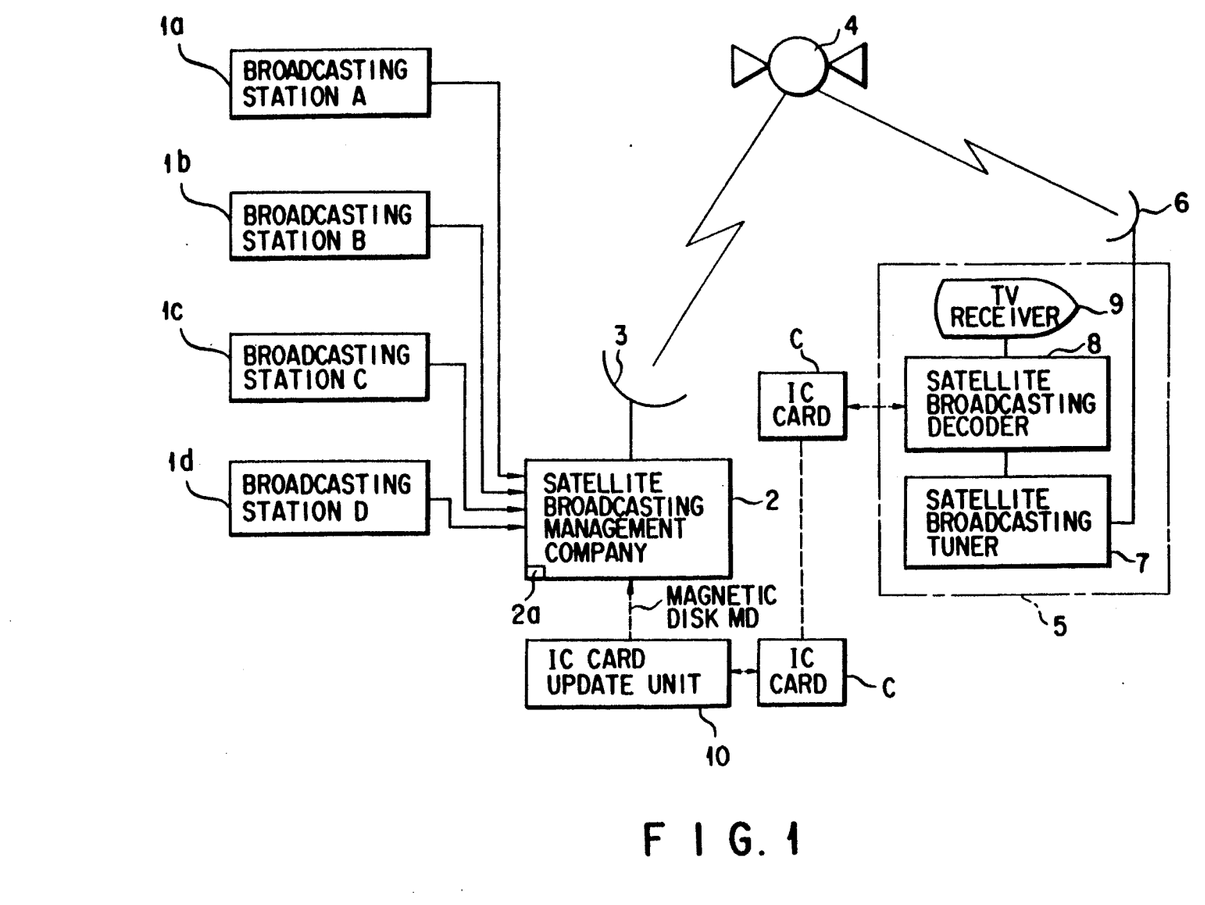
FIG. 1 is a block diagram showing the schematic arrangement of a looking and listening fee collection system according to an embodiment of the present invention.

FIG. 1 shows the schematic arrangement of a satellite broadcasting system according to the present invention.

Assume that broadcasting stations (A, B, C, D) 1a, 1b, 1c, and 1d of broadcasting companies respectively produce various programs. Broadcast signals of the respective programs broadcasted from the broadcasting stations 1a to 1d are supplied to a satellite broadcasting management company 2. Broadcast signals from other broadcasting stations are also supplied to the satellite broadcasting management company 2.

The satellite broadcasting management company 2 discriminates the broadcast signals of the respective programs supplied from the broadcasting stations 1a to 1d in units of channels, scrambles them, and transmits the scrambled signals from a transmission antenna 3 to a broadcasting satellite 4.

The broadcast signal of each of the programs is constituted by a video signal, an audio signal, and program information. Each program information is constituted by a program code and looking and listening fee information (program fee) per predetermined time unit. Although video and audio signals are scrambled, program information is not scrambled. Since a video signal and an audio signal belong to different bands, they can be discriminated. Program information has a predetermined format, and can be identified.

A program fee may be set per predetermined time unit (e.g., three minutes) or per program (e.g., for a 30-minute program).

Figure 2:
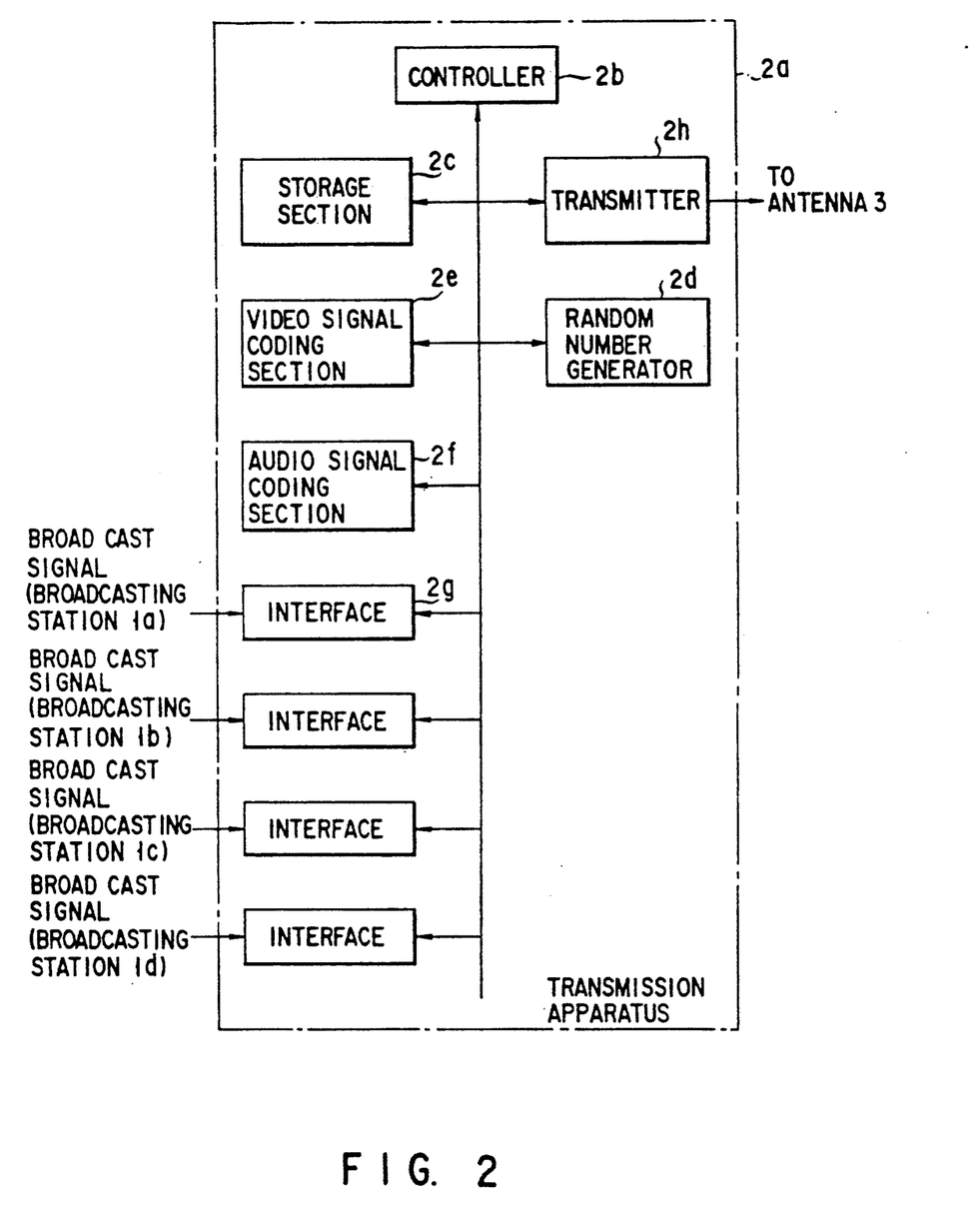
FIG. 2 is a block diagram showing the schematic arrangement of a transmission apparatus in FIG. 1.

The satellite broadcasting management company 2 is constituted by a transmission apparatus 2a, as shown in FIG. 2. The transmission apparatus 2a includes a controller 2b a storage section 2c, a random number generator 2d, a video signal coding section 2e, an audio signal coding section 2f, interfaces 2g, and a transmitter 2h, as shown in FIG. 2.

The controller 2b controls the overall transmission apparatus 2a. Control programs are stored in the storage section 2c. The random number generator 2d generates a random number used to scramble a signal. The video signal coding section 2e encodes (ciphers) a video signal by using a random number generated by the random number generator 2d (i.e., scrambles the signal). The audio signal coding section 2f encodes an audio signal by using a random number generated by the random number generator 2d (i.e., scrambles the signal).

The transmitter 2h is connected to the transmission antenna 3 to receive scrambled signals from the respective broadcasting stations 1a to 1d through the antenna 3 while they are discriminated in units of channels, i.e., frequency bands.

The interfaces 2g are connected to the broadcasting stations 1a to 1d and are designed to receive broadcast signals supplied from the respective stations 1a to 1d.

According to such an arrangement, for example, a broadcast signal from the broadcasting station 1a is supplied through the interface 2g. The controller 2b then causes the video signal coding section 2e to scramble the video signal contained in the broadcast signal by encoding it. In addition, the controller 2b causes the audio signal coding section 2f to scramble the audio signal contained in the broadcast signal by encoding it.

The controller 2b outputs a broadcast signal, obtained by synthesizing the scrambled video and audio signals with program information from the interface 2g, to the transmitter 2h. The transmitter 2h transmits the synthesized signal from the antenna 3 by using a transmission signal belonging to a frequency band corresponding to the broadcasting station 1a.

The broadcasting satellite 4 re-transmits the broadcast signal, transmitted from the transmission antenna 3 for satellite broadcasting, to reception antennas 6 for satellite broadcasting installed in subscriber's homes 5 and the like.

Each home 5 includes a satellite broadcasting tuner 7 for converting broadcast signals received through the reception antenna 6 into electrical signals in units of satellite broadcasting stations, a satellite broadcasting decoder 8 for descrambling (decoding) a broadcast signal from the satellite broadcasting tuner 7, and a TV receiver 9 for outputting an image and a sound corresponding to the broadcast signal decoded by the satellite broadcasting decoder 8.

The satellite broadcasting tuner 7 includes an operating portion (not shown), by which a satellite broadcasting station (a program and a channel) is selected. The operating portion may be operated by a remote controller.

Upon selection of a broadcasting station, the satellite broadcasting tuner 7 outputs an electrical signal of each selected broadcasting station to the satellite broadcasting decoder 8.

The satellite broadcasting decoder 8 has a function of receiving an IC card C and subtracting a looking and listening fee for satellite broadcasting from the balance as the monetary value of the received IC card C.

The balance of the IC card C is updated by an IC card update unit 10 installed in a convenience store or the like.

Figure 3:
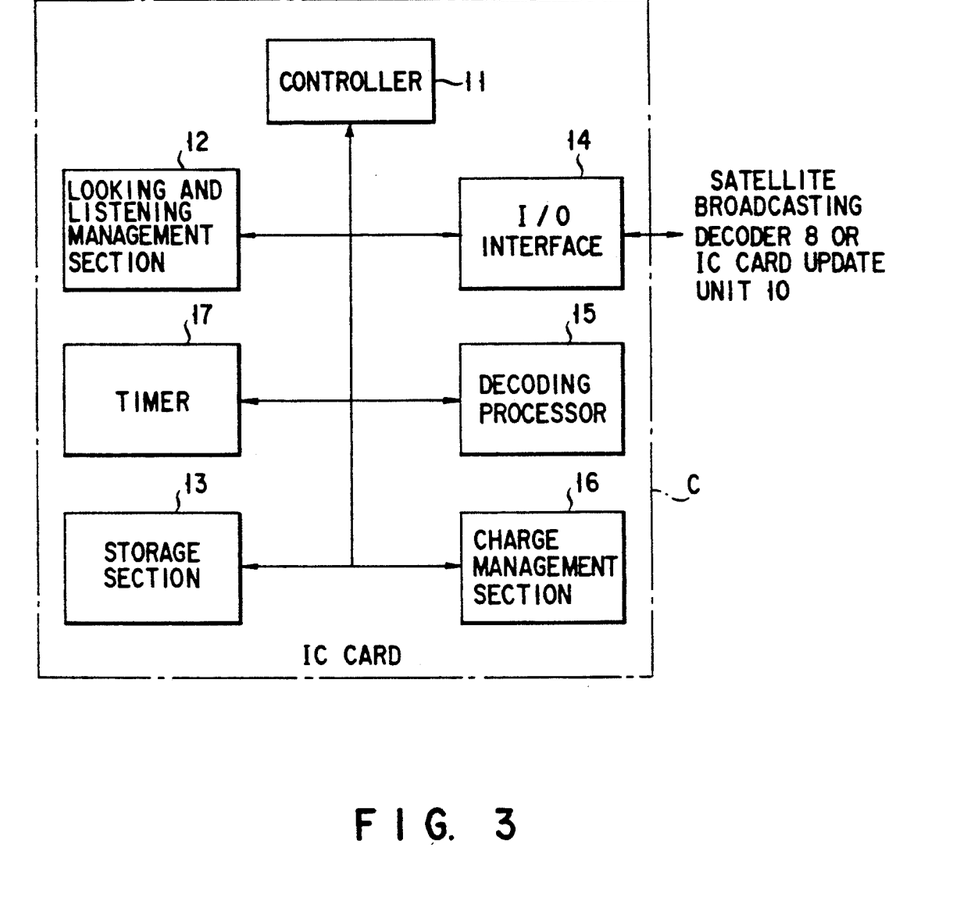
FIG. 3 is a block diagram showing the schematic arrangement of an IC card in FIG. 1.

The IC card C is constituted by a controller 11, a looking and listening management section 12, a storage section 13, an I/O interface 14, a decoding processor 15, a charge management section 16, and a timer 17, as shown in FIG. 3.

The controller 11 controls the overall IC card C. The looking and listening management section 12 stores looking and listening information consisting of a program code, a looking and listening amount, and a looking and listening date/time. The storage section 13 stores control programs and balances and the like of the respective broadcasting stations. The I/O interface 14 is connected to an external unit (not shown). The decoding processor 15 generates a decoding signal. The charge management section 16 calculates a looking and listening amount from a program fee and a looking and listening time. The timer 17 measures the current date and time, and a time during which a pay broadcast is watched, i.e., an elapsed time.

A program code of looking and listening information may be substituted by a looking and listening channel, and a looking and listening amount may be substituted by a looking and listening time from a specific time to a specific time.

Figure 4:
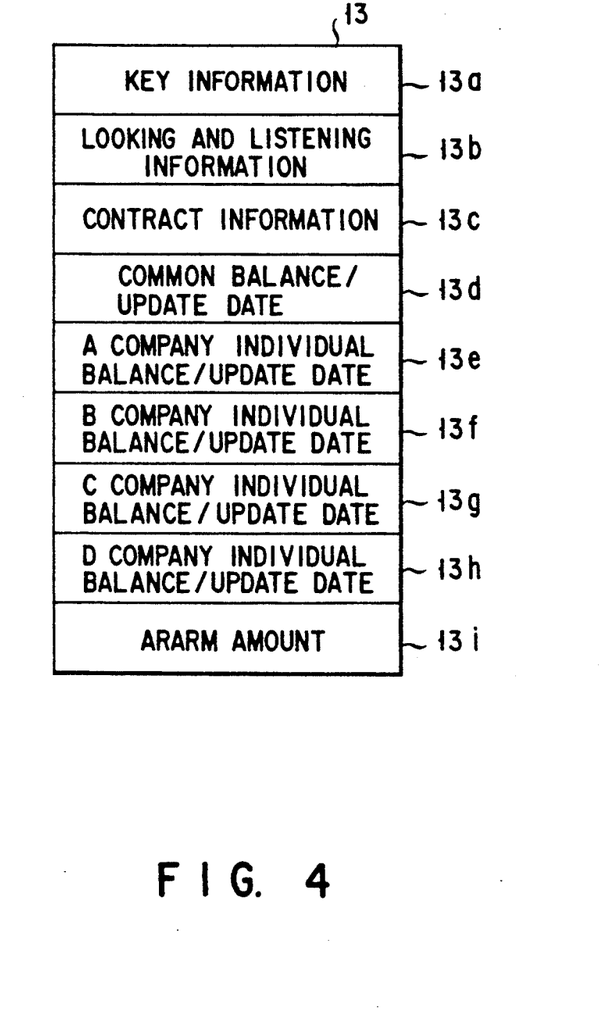
FIG. 4 is a view showing a format of a storage section of the IC card in FIG. 1.

The storage section 13 is constituted by storage areas 13a to 13i, as shown in FIG. 4.

The storage area 13a stores key information (cipher keys for decoding). The storage area 13b stores looking and listening information consisting of a program code and looking and listening amount. The storage area 13c stores contract information (update information) such as a maximum amount limit. The storage area 13d stores a common balance as the balance of an amount used for broadcasting stations other than the broadcasting stations A to D and its update date. The storage area 13e stores a company A individual balance as the balance of an amount used for the broadcasting station A and its update date. The storage area 13f stores a company B individual balance as the balance of an amount used for the broadcasting station B and its update date. The storage area 13g stores a company C individual balance as the balance of an amount used for the broadcasting station C and its update date. The storage area 13h stores a company D individual balance as the balance of an amount used for the broadcasting station D and its update date. The storage area 13i stores an alarm amount as a reference. The above-mentioned update information includes a minimum amount limit, a designated amount, and a valid term (a start date and an end date) in addition to a maximum amount limit.

The stored contents of the storage areas 13a to 13i are registered in advance at the time of issuance.

Note that even if the subscriber subscribes to a new broadcasting station, a looking and listening fee for the new broadcasting station can be collected from the common balance stored in the storage area 13d.

If a given individual balance is used up, a looking and listening fee for the corresponding broadcasting station can be collected from the common balance under the control of the charge management section 16.

In addition, if a discount or a premium is given for the use of the common balance when a given individual balance is used up, the cost associated with distribution in the case of the use of the common balance can be reduced.

Figure 5:
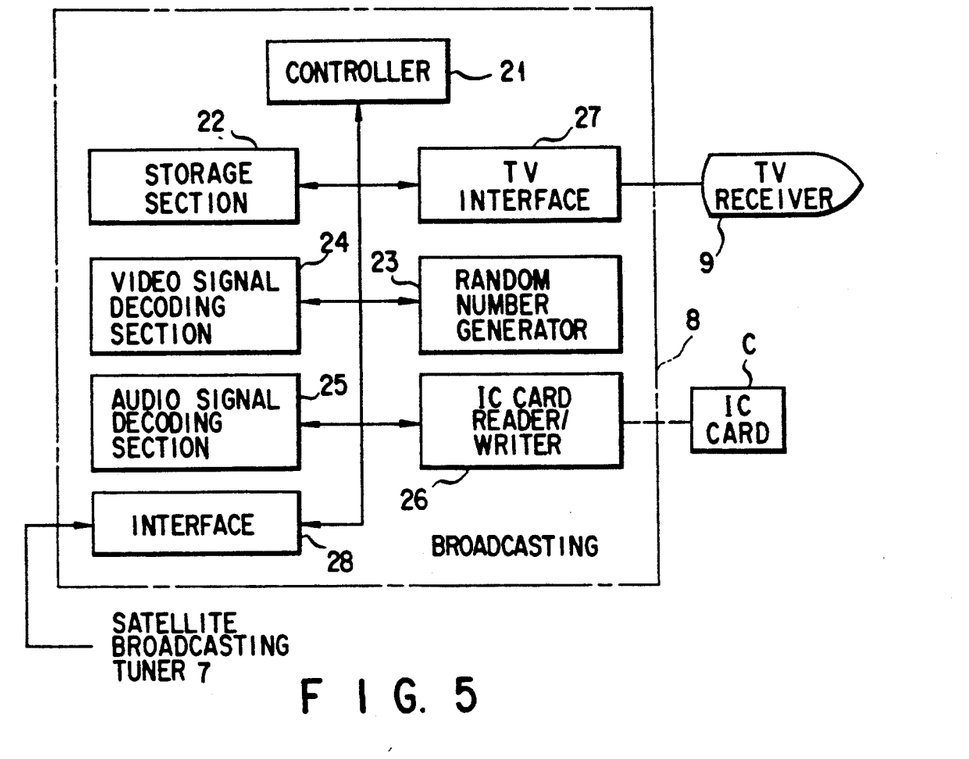
FIG. 5 is a block diagram showing the schematic arrangement of a satellite broadcasting decoder in FIG. 1.

As shown in FIG. 5, the satellite broadcasting decoder 8 is constituted by a main controller 21, a storage section 22, a random number generator 23, a video signal decoding section 24, an audio signal decoding section 25, an IC card reader/writer 26, a TV interface 27, and an interface 28.

The main controller 21 controls the overall satellite broadcasting decoder 8. The storage section 22 stores control programs. The random number generator 23 generates a random number used to descramble a signal. The video signal decoding section 24 decodes a video signal (restores a scrambled signal to an original signal). The audio signal decoding section 25 decodes an audio signal (restores a scrambled signal to an original signal). The IC card reader/writer 26 reads out data from an IC card C or writes data therein. The TV interface 27 is connected to the TV receiver 9. The interface 28 is connected to the satellite broadcasting tuner 7.

Figure 6:
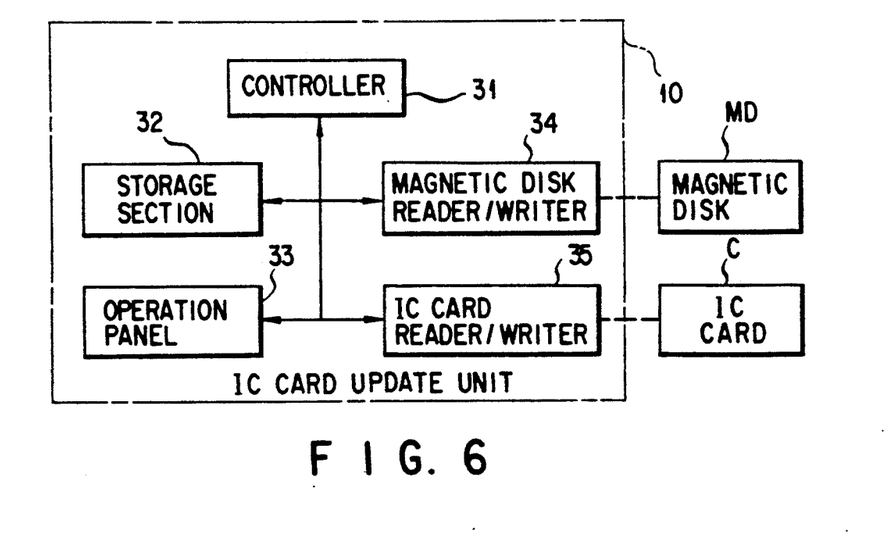
FIG. 6 is a block diagram showing the schematic arrangement of an IC card update unit in FIG. 1.

The IC card update 10 is constituted by a main controller 31, a storage section 32, an operation panel 33, a magnetic disk reader/writer 34, and an IC card reader/writer 35, as shown in FIG. 6.

The main controller 31 controls the overall IC card update unit 10. The storage section 32 stores control programs. The operation panel 33 is used to input a broadcasting station to be updated or an update amount and inform that the valid term is expired, a broadcast cannot be watched because of a balance shortage, or the update amount limit is exceeded. The magnetic disk reader/writer 34 reads out data from a magnetic disk MD or writes data therein. The IC card reader/writer 35 reads out data from the IC card C or writes data therein.

In the magnetic disk MD, looking and listening information consisting of a program code and a looking and listening amount read out from the IC card C is registered. The magnetic disk MD is delivered to the satellite broadcasting management company 2, and the company 2 reads out and totals pieces of looking and listening information stored in the magnetic disk MD. The satellite broadcasting management company 2 then determines and distributes looking and listening fees with respect to the respective broadcasting companies in accordance with various kinds of totaled information read out from the magnetic disk MD.

Figure 7:
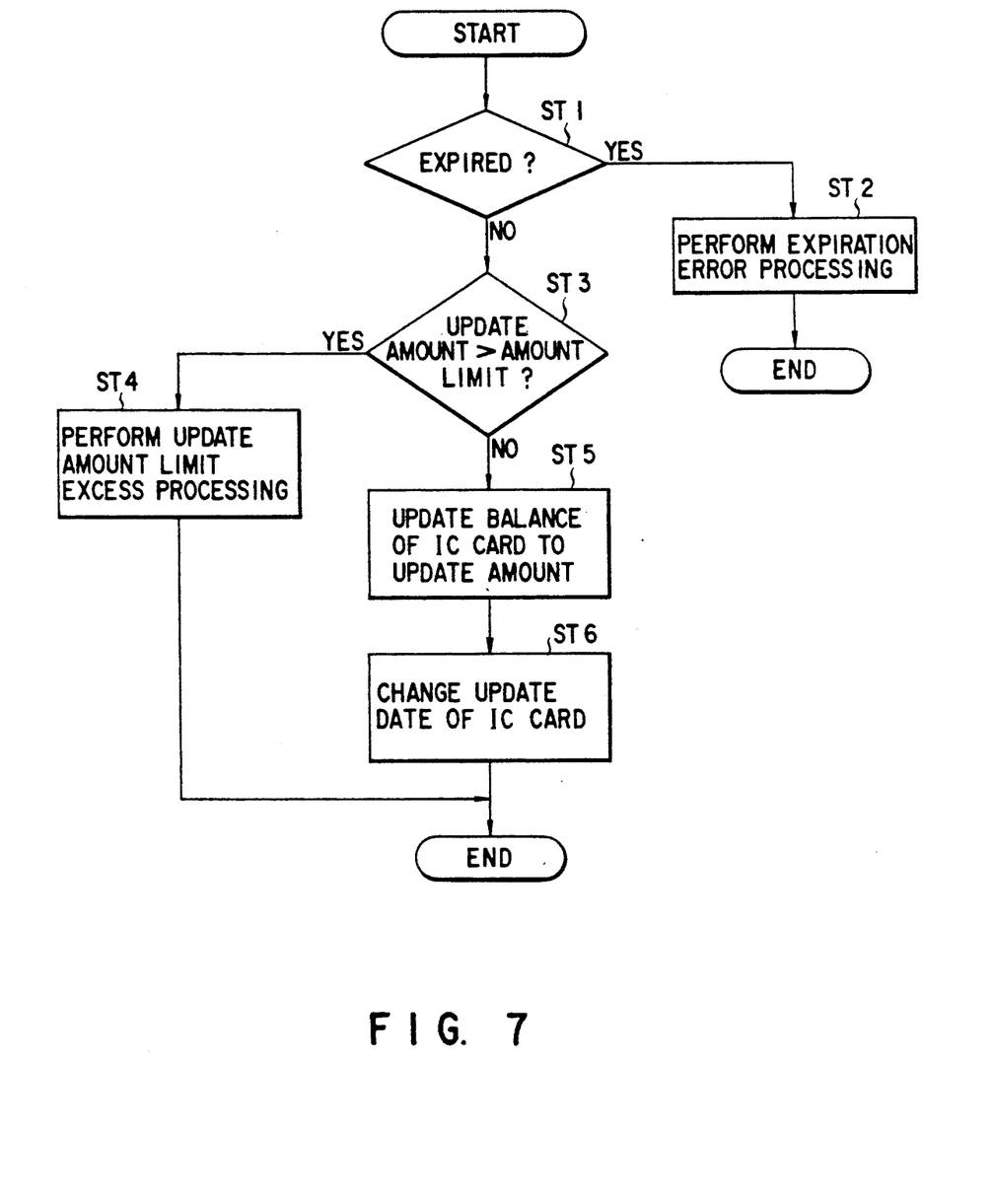
FIG. 7 is a flow chart for explaining update processing performed by the IC card update unit in FIG. 1.

Update processing of the IC card C by means of the IC card update unit 10 will be described next with reference to the flow chart shown in FIG. 7.

When the balance of the IC card C is reduced to a small amount, the holder (subscriber) of the IC card goes to a convenience store in which the IC card update unit 10 is installed, and hands over cash in an update amount and the IC card to a clerk of the store. The clerk inserts the received IC card into an IC card insertion slot (not shown) of the IC card update unit 10, and inputs a broadcasting station associated with the update operation and the update amount through the operation panel 33.

The stored contents of the storage section 13 of the IC card C inserted into the IC card insertion slot are read out by the IC card reader/writer 35 and are output to the main controller 31. The main controller 31 checks the valid term of the IC card C on the basis of the stored contents of the storage section 13 of the IC card C, i.e., the valid term stored in the contract information storage area 13c (ST1). If the term is expired, the expiration is informed through the operation panel 33 (ST2).

If the term is not expired, the main controller 31 checks whether the sum of the current update amount and the balance of the corresponding broadcasting station, stored in the IC card, is larger than the amount limit (ST3). If the sum is larger than the amount limit, it is informed through the operation panel 33 that the update amount limit is exceeded (ST4). If the sum is smaller than the amount limit, the main controller 31 updates the balance of the corresponding broadcasting station, stored in the IC card, to the sum amount, and also updates the update date information (ST5 and ST6).

If, for example, update processing is performed with respect to the broadcasting station A, the balance and update date stored in the storage area 13e of the IC card C are updated. If update processing is performed with respect to the broadcasting station B, the balance and the update date stored in the storage area 13f of the IC card C are updated. If update processing is performed with respect to the broadcasting station D, the balance and the update date stored in the storage area 13h of the IC card C are updated. If update processing is performed with respect to a broadcasting station other than the broadcasting stations A to D, the balance and the update date stored in the storage area 13d of the IC card are updated.

The main controller 31 reads out a program code and a looking and listening amount as looking and listening information stored in the looking and listening management section 12 of the IC card C are read out by using the IC card reader/writer 35, and stores them in the magnetic disk MD by using the magnetic disk reader/writer 34.

When the IC card C is ejected from the IC card insertion slot upon completion of the above processing, the clerk returns the IC card C to the possessor.

Figure 8:
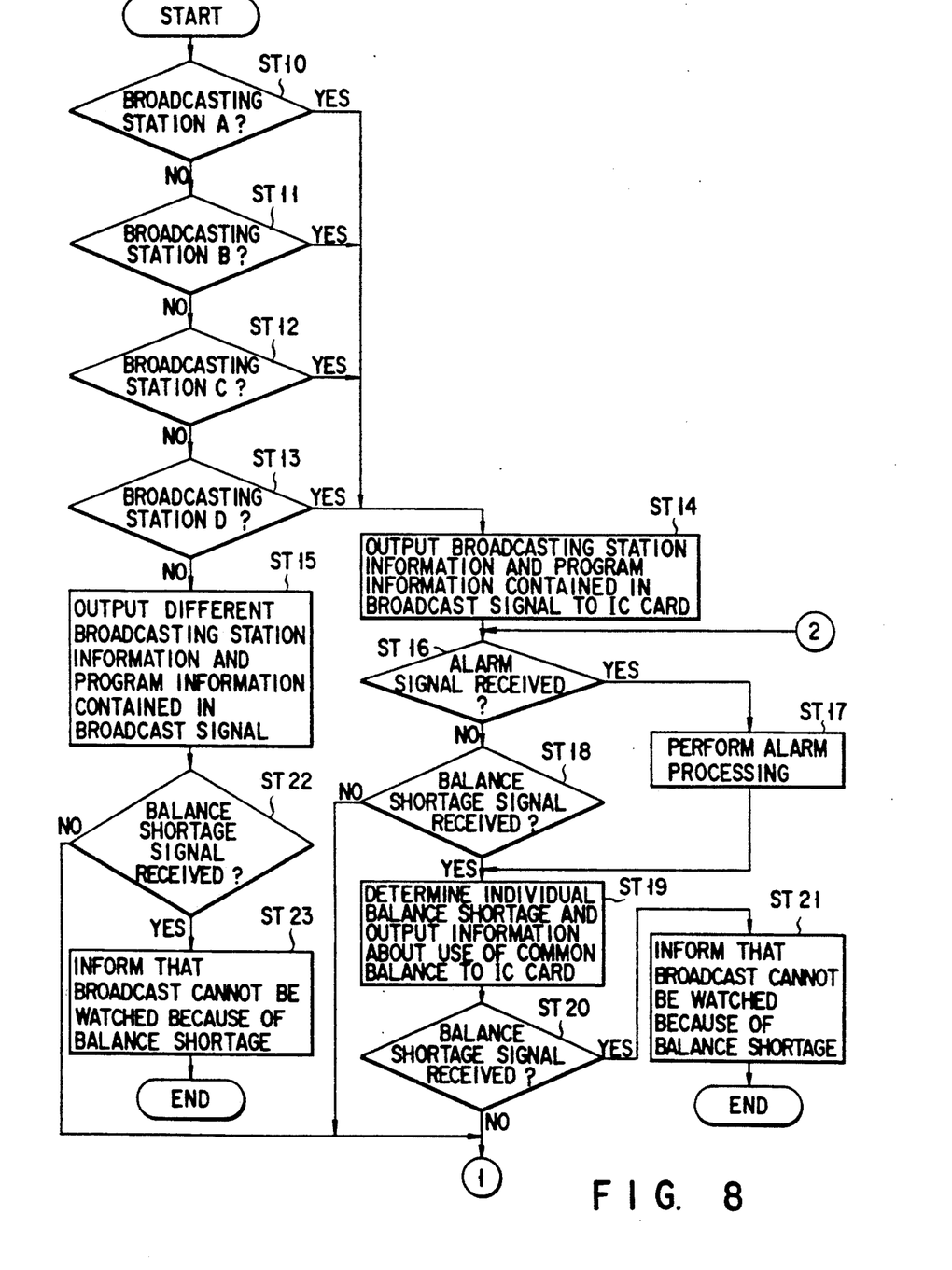
FIGS. 8 and 9 are flow charts for explaining operations in looking and listening processing by means of the satellite broadcasting decoder in FIG. 1.
Figure 9:
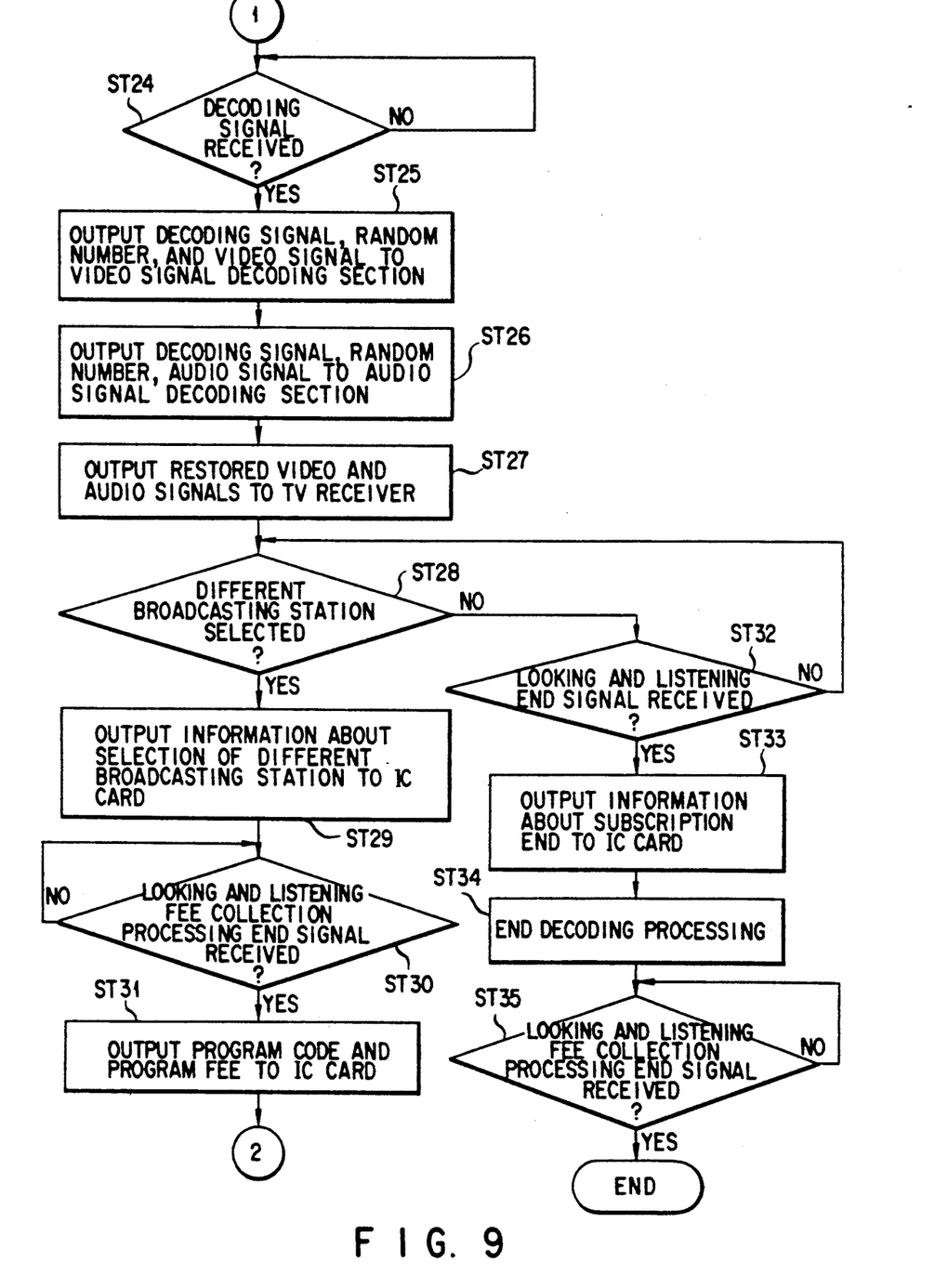

An operation of the satellite broadcasting decoder 8 in looking and listening processing will be described below with reference to the flow charts shown in FIGS. 8 and 9.

The holder of the IC card C inserts IC card C into an IC card insertion slot (not shown) of the satellite broadcasting decoder 8, and selects a broadcasting station (program to be watched) through the satellite broadcasting tuner 7. If the broadcasting station A is selected, the satellite broadcasting tuner 7 outputs a broadcast signal, transmitted from the broadcasting station A, to the satellite broadcasting decoder 8. If another broadcasting station such as the broadcasting station B, C, or D is selected, the satellite broadcasting tuner 7 outputs a broadcast signal, transmitted from the broadcasting station, B, C, or D, to the satellite broadcasting decoder 8.

The main controller 21 of the satellite broadcasting decoder 8 determines on the basis of the broadcast signal supplied from the satellite broadcasting decoder 8 whether the selected broadcasting station is the broadcasting station A, B, C, or D or another broadcasting station (ST10 to ST13).

If it is determined that the broadcast signal is supplied from the broadcasting station A, B, C, or D, the main controller 21 outputs information about the reception of the broadcast from the broadcasting station A, B, C, or D and a program code and a program fee as program information contained in the broadcast signal to the controller 11 of the IC card C inserted into the IC card insertion slot by using the IC card reader/writer 26 (ST14).

If it is determined that the broadcast signal is supplied from a broadcasting station other than the broadcasting stations A to D, the main controller 21 outputs information about the reception of the broadcast from a broadcasting station other than the broadcasting stations A to D and a program code and a program fee as program information contained in the broadcast signal to the controller 11 of the IC card C inserted into the IC card insertion slot by using the IC card reader/writer 26 (ST15).

If an alarm signal is supplied from the controller 11 to the main controller 21 in response to the data output in step ST14 (ST16), the main controller 21 determines that the individual balance with respect to the corresponding broadcasting station is reduced to a small amount, and informs it through the TV receiver 9 (ST17).

With this operation, a warning can be given to the subscriber before he/she becomes unable to watch the broadcast because of the balance shortage of the IC card C, thus achieving an improvement in serviceability.

If a balance shortage signal is supplied from the controller 11 to the main controller 21 in response to the data output in step ST14 (ST18), or alarm processing in step ST17 is performed, the main controller 21 determines the individual balance shortage with respect to the corresponding broadcasting station, and outputs information about the use of the common balance to the controller 11 (ST19).

If a balance shortage signal is supplied from the controller 11 to the main controller 21 in response to the information output in step ST19 (ST20), the main controller 21 determines a common balance shortage, and informs, through the TV receiver 9, that the broadcast cannot be watched because of the balance shortage (ST21).

If a balance shortage signal with respect to the common balance is supplied from the controller 11 to the main controller 21 in response to the data output in step ST15 (ST22), the main controller 21 determines a common balance shortage, and informs, through the TV receiver 9, that the broadcast cannot be watched because of the balance shortage (ST23).

If a decoding signal required for a decoding operation is supplied from the controller 11 to the main controller 21 in response to the data output in steps ST14, ST15, and ST19 (ST24), the main controller 21 outputs the decoding signal, a random number generated by the random number generator 23, the video signal (scrambled) of the broadcast signal, supplied from the satellite broadcasting tuner 7, to the video signal decoding section 24 (ST25).

The video signal decoding section 24 descrambles the scrambled video signal by using the random number from the random number generator 23 and the decoding signal from the IC card C, thus restoring the signal to the original video signal.

In addition, a decoding signal from the IC card C, a random number from the random number generator 23, and the audio signal (scrambled) of the broadcast signal supplied from the satellite broadcasting tuner 7 are output to the audio signal decoding section 25 (ST26).

The audio signal decoding section 25 descrambles the scrambled audio signal by using the random number from the random number generator 23 and the decoding signal from the IC card C, thus restoring the signal to the original audio signal.

The main controller 21 outputs the restored video and audio signals to the TV receiver 9 through the TV interface 27 (ST27). With this operation, the program from the broadcasting station A (B, C, or D) is televised on the TV receiver 9.

If a different broadcasting station (program) is selected by the operating portion of the satellite broadcasting tuner 7, a broadcast signal from the selected broadcasting station is output to the satellite broadcasting decoder 8.

The main controller 21 of the satellite broadcasting decoder 8 determines on the basis of the broadcast signal supplied from the satellite broadcasting decoder 8 that a different broadcasting station is selected (ST28).

If it is determined that a different broadcasting station is selected, the main controller 21 outputs information about the selection to the controller 11 of the IC card C (ST29).

If a looking and listening fee collection processing end signal is supplied from the controller 11 in response to the information output in step ST29 (ST30), information about the different broadcasting station and a program code and a program fee as program information contained in the broadcast signal are output to the controller 11 of the IC card C (ST31).

Subsequently, steps ST16 to ST27 are performed in the same manner as described above.

If a looking and listening end is designated by the operating portion of the satellite broadcasting tuner 7, a looking and listening end signal is output to the satellite broadcasting decoder 8.

The main controller 21 of the satellite broadcasting decoder 8 determines the end of the looking and listening on the basis of the looking and listening end signal supplied from the satellite broadcasting tuner 7 (ST32).

Upon determining the end of the looking and listening, the main controller 21 outputs information about the looking and listening end to the controller 11 of the IC card C (ST33), and stops decoding video and audio signals, thus completing the televising operation through the TV receiver 9 (ST34).

If a looking and listening fee collection processing end signal is supplied from the controller 11 in response to the information output in step ST33 (ST35), the looking and listening processing is completed.

Figure 10:
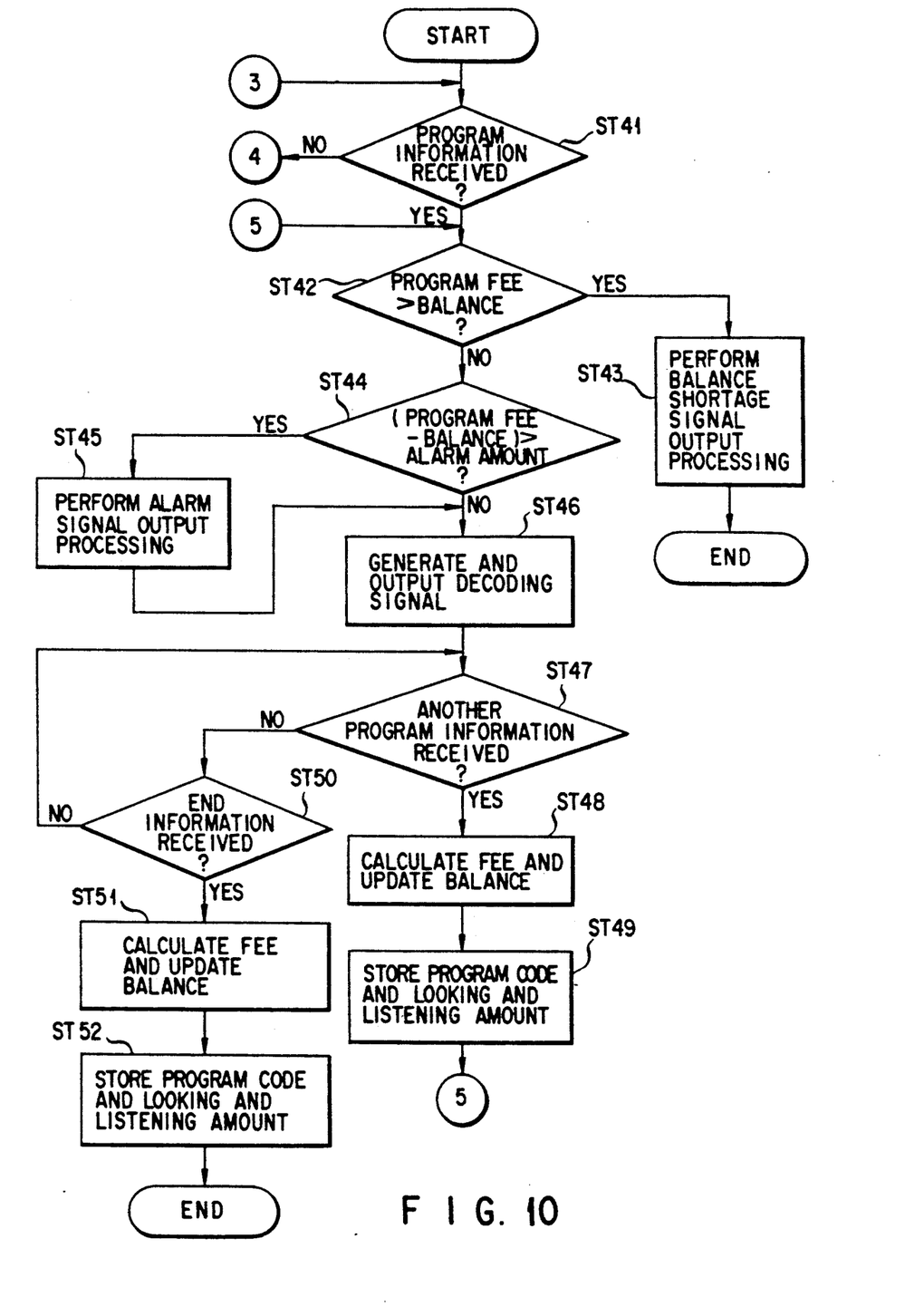
FIGS. 10 and 11 are flow charts for explaining operations in looking and listening processing by means of the IC card in FIG. 1.
Figure 11:
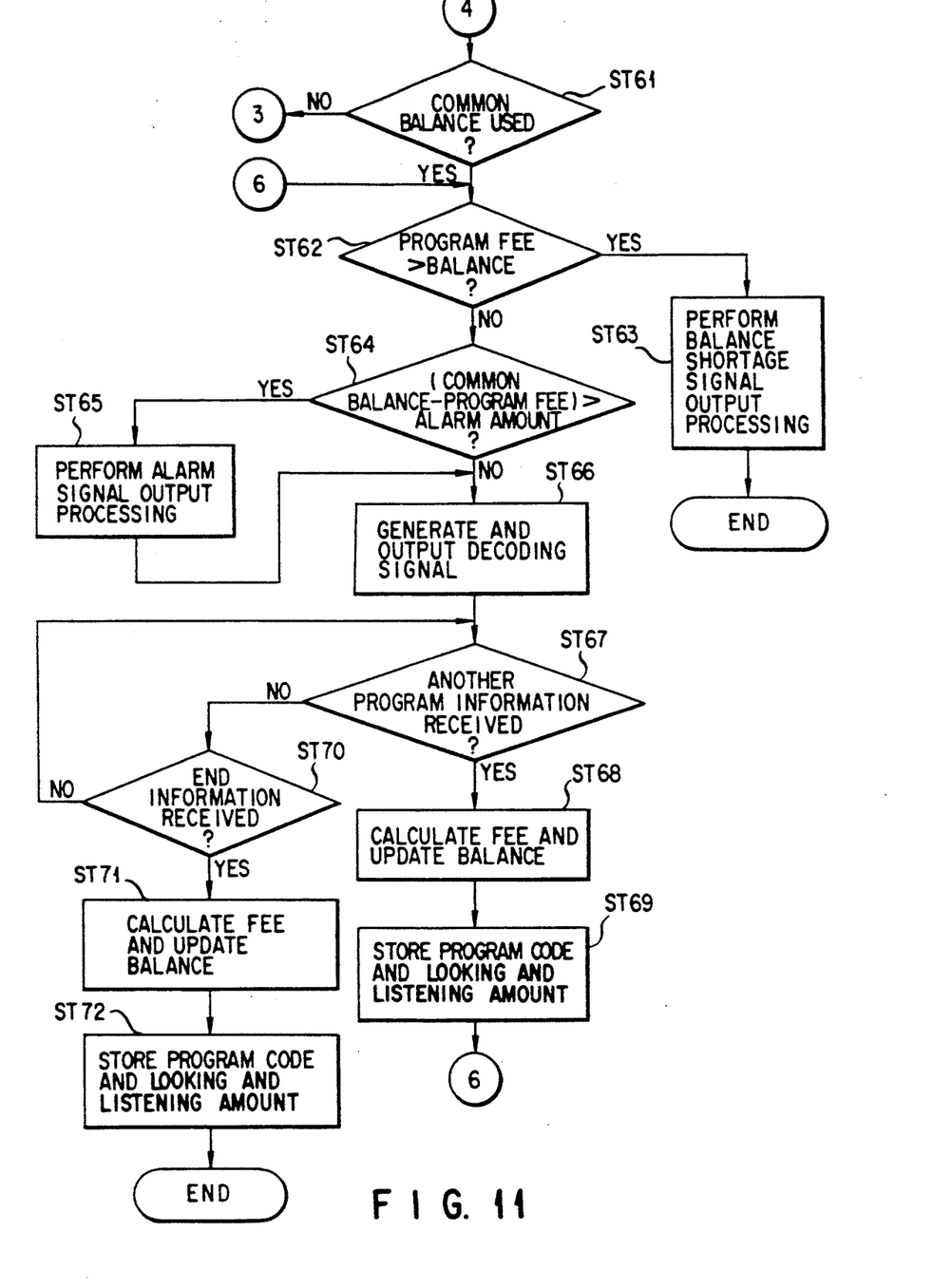

An operation of the IC card C in looking and listening processing will be described below with reference to the flow charts shown in FIGS. 10 and 11.

If the controller 11 of the IC card C receives information about the reception of a broadcast from the broadcasting station A (B, C, or D) and a broadcast signal from the satellite broadcasting decoder 8 (ST41), the controller 11 compares the company A individual balance stored in the storage area 13e of the storage section 13, which corresponds to the broadcasting station A (B, C, or D), with the program fee (ST42). If the company A individual balance is smaller, a balance shortage signal is output to the main controller 21 of the satellite broadcasting decoder 8 (ST43).

If the company A individual balance is larger, the controller 11 checks whether the amount obtained by subtracting the program fee from the company A individual balance is smaller than the alarm amount stored in the storage area 13i of the storage section 13 (ST44). If it is smaller than the alarm amount, the controller 11 outputs an alarm signal to the main controller 21 of the satellite broadcasting decoder 8 (ST45).

If it is larger than the alarm amount, the controller 11 causes the decoding processor 15 to generate a decoding signal required for decoding processing by using a cipher key read out from the storage area 13a of the storage section 13, and outputs it to the main controller 21 of the satellite broadcasting decoder 8 (ST46).

If another program information is supplied from the main controller 21 (ST47), the controller 11 causes the charge management section 16 to calculate a looking and listening amount from an elapsed time measured by the timer 17 and a program fee, and updates the company A individual balance stored in the storage area 13e of the storage section 13 in accordance with the amount obtained by subtracting the looking and listening amount from the company A individual balance stored in the shortage area 13e. In addition, the controller 11 stores a date measured by the timer 17 as an update date (ST48).

The controller 11 stores the program code and the looking and listening amount in the looking and listening management section 12 (ST49).

If end information is supplied from the main controller 21 (ST50), the controller 11 causes the charge management section 16 to calculate a looking and listening amount from an elapsed time measured by the timer 17 and a program fee, and updates the company A individual balance stored in the storage area 13e of the storage section 13 in accordance with the amount obtained by subtracting the looking and listening amount from the company A individual balance stored in the shortage area 13e. In addition, the controller 11 stores a date measured by the timer 17 as an update date (STS1).

The controller 11 stores the program code and the looking and listening amount in the looking and listening management section 12 (ST52).

If a program from the broadcasting station B, C, or D is selected, the IC card C is operated in the same manner as in the case wherein the broadcasting station A is selected, and the individual balance (corresponding to the selected broadcasting station) stored in the storage section 13 of the IC card C is updated in accordance with the looking and listening amount.

If the use of the common balance is designated by the main controller 21 when a broadcast from the broadcasting station A (B, C, or D) cannot be watched because of the individual balance shortage (ST61), the controller 11 compares the common balance stored in the shortage area 13d of the storage section 13 with the program fee (ST62). If the common balance is smaller, the controller 11 outputs a balance shortage signal to the main controller 21 of the satellite broadcasting decoder 8 (ST63).

If the common balance is larger, the controller 11 checks whether the amount obtained by subtracting the program fee from the common balance is smaller than the alarm amount stored in the storage area 13i of the storage section 13 (ST64). If it is smaller than the alarm amount, the controller 11 outputs an alarm signal to the main controller 21 of the satellite broadcasting decoder 8 (ST65). If it is larger than the alarm amount, the controller 11 causes the decoding processor 15 to generate a decoding signal required for decoding processing by using a cipher key read out from the storage area 13a of the storage section 13, and outputs it to the main controller 21 of the satellite broadcasting decoder 8 (ST66).

If another program information is supplied from the main controller 21 (ST67), the controller 11 causes the charge management section 16 to calculate a looking and listening amount from an elapsed time measured by the timer 17 and a program fee, and updates the common balance stored in the storage area 13d of the storage section 13 in accordance with the amount obtained by subtracting the looking and listening amount from the common balance stored in the storage area 13d. In addition, the controller 11 stores an update date measured by the timer 17 as an update date (ST68).

The controller 11 stores the program code and the looking and listening amount in the looking and listening management section 12 (ST69).

When end information is supplied from the main controller 21 (ST70), the controller 11 causes the charge management section 16 to calculate a looking and listening amount from an elapsed time measured by the timer 17 and a program fee, and updates the common balance stored in the storage area 13d of the storage section 13 in accordance with the amount obtained by subtracting the looking and listening amount from the common balance stored in the storage area 13d. In addition, the controller 11 stores a date measured by the timer 17 as an update date (ST71).

The controller 11 stores the program code and the looking and listening amount in the broadcast management section 12 (ST72).

If a broadcasting station other than the broadcasting stations A to D is selected, the IC card C is operated in the same manner as in the case wherein the broadcasting station A is selected, and the common balance stored in the storage area 13d of the storage section 13 of the IC card C is updated in accordance with the looking and listening amount. In addition, the update date is updated.

As described above, looking and listening fees for satellite broadcasting can be collected in unit of programs or on a time basis.

In addition, the system of the present invention allows each of a plurality of broadcasting stations to collect looking and listening fees for pay broadcasting in units of programs or on a time basis.

According to the present invention, an IC card to which a monetary value commonly used for a plurality of broadcasting stations, and an individual monetary value used for each broadcasting station are given is prepared so that if an individual balance is used up, a looking and listening fee for pay broadcasting can be collected from the common balance.

Furthermore, processing required to watch a program is performed by using an IC card to prevent a non-subscriber from illegally watching the program by means of alteration of a decoder or the like.

Moreover, when the balance of an IC card is updated, its amount limit and valid term are checked so that unauthorized use of the IC card by a third person can be prevented.

In the above embodiment, both video and audio signals are scrambled. However, the present invention is not limited to this. For example, only a video signal may be scrambled while an audio signal is not scrambled.

Figure 12:
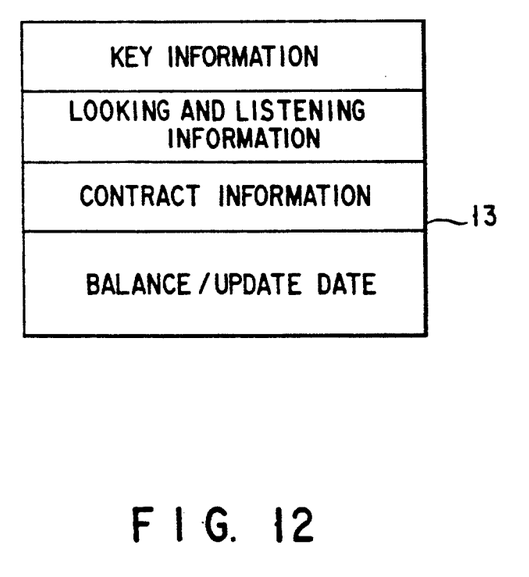
FIG. 12 is a view showing a format of the storage section of the IC card in FIG. 1.

In addition, according to the above embodiment, each of a plurality of broadcasting stations collects looking and listening fees from an IC card. However, the present invention is not limited to this. For example, looking and listening fees may be commonly collected from an IC card with respect to a plurality of broadcasting stations, or looking and listening fees may be collected from an IC card corresponding to one broadcasting station. In this case, as shown in FIG. 12, the storage section of an IC card is constituted by a storage area for storing key information, a storage area for storing looking and listening information, a storage area for storing contract information, and a storage area for storing a balance and an update date.

The number of remaining toll units may be stored in the storage section of an IC card instead of the balance.

In addition, in the above embodiment, an update amount limit and a valid term are stored in the contract information area of the storage section of an IC card. However, these data may be stored in another storage area of the storage section.

Furthermore, in the above embodiment, data are exchanged between an IC card update unit and the satellite broadcasting management company through a magnetic disk. However, the present invention is not limited to this. Data may be exchanged between an IC card update unit and the satellite broadcasting management company through other storage media such as a magnetic tape and a floppy disk, or online.

Moreover, satellite broadcasting has been exemplified as pay broadcasting. However, the present invention can be applied to pay broadcasting such as cable broadcasting, e.g., cable television broadcasting.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An audio-visual system for collecting a looking and listening fee for pay broadcasting by using an IC card, the audio-visual system comprising:
   means for receiving locking and listening fee information and scrambled audio-visual information, both sent from a station;
   means for descrambling the audio-visual information received by the receiving means; and
   means for outputting the descrambled audio-visual information descrambled by the descrambling means; and
   an IC card including
      means for storing balance information representing a balance of a prepaid fee, and
      means for updating the balance information stored in the storing means on the basis of the looking and listening fee information received by the receiving means.

2. The audio-visual system according to claim 1, further comprising:
   means for determining if the balance of the prepaid fee is insufficient based on the looking and listening fee information; and
   means for preventing output from the output means when the determining means determines that the prepaid fee is insufficient.

3. The audio-visual system according to claim 1, further comprising:
   means for determining whether the balance of the prepaid fee is less than a predetermined amount; and
   indicating means for indicating that the balance of the prepaid fee is less then the predetermined amount when the determining means determines that the balance of the prepaid fee is less than the predetermined amount.

4. The audio-visual system according to claim 1, wherein the IC card includes key storing means for storing a descrambling key, and the descrambling means descrambles the audio-visual information by using the descrambling key read out from the key storing means of the IC card.

5. The audio-visual system according to claim 1, wherein the updating means includes:
   means for measuring a looking and listening time of the pay broadcasting; and
   calculating means for calculating amount of looking and listening fee on the basis of the time measured by the measuring means and the fee information received by the receiving means.

6. The audio-visual system according to claim 1 wherein the updating means includes detection means for detecting whether looking and listening of the pay broadcasting has been finished, and the updating means updates the balance of the prepaid fee after the detection means detects that the looking and listening of the pay broadcasting has been finished.

7. The audio-visual system according to claim 1, wherein the storing means includes first storing means for storing balance data of the prepaid fee used for each of broadcasting stations, and second storing means for storing balance data of the prepaid fee used commonly for all broadcasting stations.

8. The audio-visual system according to claim 7, wherein the updating means includes detection means for detecting whether a program of the pay broadcasting has been changed, and the updating means updates the balance of the prepaid information after the detection means detects that the program of the pay broadcasting has been changed.

9. An audio-visual system for collecting a looking and listening fee for pay broadcasting by using an IC card, the audio-visual system comprising:
   means for receiving locking and listening fee information and scrambled audio-visual information, both sent from a station;
   means for descrambling the audio-visual information received by the receiving means;
   means for outputting the descrambled audio-visual information descrambled by the descrambling means; and
   an IC card including
      first storing means for storing balance data representing a balance of a prepaid fee used for an individual broadcasting station,
      second storing means for storing balance data representing a balance of a prepaid fee used commonly for broadcasting stations, and
      updating means for updating the balance data in one of the first and second storing means on the basis of the looking and listening fee information received by the receiving means.

10. The audio-visual system according to claim 9, further comprising:
    first determination means for determining whether the balance of the prepaid fee for an individual broadcasting station stored in the first storing means is inadequate for subtracting the looking and listening fee therefrom; and
    second determination means for determining whether the balance of the prepaid fee used commonly for broadcasting stations stored in the second storing means is inadequate for subtracting the looking and listening fee therefrom when the first determination means determines that the balance of the prepaid fee for an individual broadcasting station stored in the first storage means is inadequate,
    wherein when the balance of the prepaid fee for an individual broadcasting station stored in the first storing means is short, the shortage is subtracted from the balance stored in the second storing means.

11. The audio-visual system according to claim 9, further comprising:
    means for determining if the balances of the prepaid fees in the first and second storing means are insufficient based on the looking and listening fee information; and
    means for preventing output from the output means when the determining means determines that the balances of the prepaid fees in both the first and second storing means is insufficient.

12. The audio-visual system according to claim 9, further comprising:
    determination means for determining whether the balance of the prepaid fee stored in the first storing means is less than a predetermined amount; and
    indicating means for indicating that the balance of the prepaid fee stored in the first storing means is less than the predetermined amount when the determination means determining that the balance of the prepaid fee in the first storing means is less than the predetermined amount.

13. The audio-visual system according to claim 9, wherein the IC card includes storing means for storing a descrambling key, and the descramble means descrambles the audio-visual information by using the key read out from the IC card.

14. The audio-visual system according to claim 9, wherein the updating means includes:
    means for measuring a looking and listening time of the pay broadcasting; and
    calculating means for calculating an amount of looking and listening fee on the basis of the time measured by the measuring means and the fee information received by the receiving means, 15. The audio-visual system according to claim 9, wherein the updating means includes detection means for detecting whether looking and listening of the pay broadcasting has been finished, and the updating means updates the balance of the prepaid fee after the detection means detects that the looking and listening of the pay broadcasting has been finished.

16. The audio-visual system according to claim 9, wherein the updating means includes detection means for detecting whether a program of the pay broadcasting has been changed, and the updating means updates the balance of the prepaid information after the detection means detects that the program of the pay broadcasting has been changed.

17. An audio-visual system for updating the balanced stored in an IC card for collecting a looking and listening fee for pay broadcasting, the audio-visual system comprising:
    an IC card including
       first storing means for storing balance data representing balances of prepaid fees used for individual broadcasting stations,
       second storing means for storing balance data representing a balance of a prepaid fee used commonly for broadcasting stations, and third storing means for storing a limit amount for each balance of the prepaid fees stored in the first and second storing means;

an updating device for setting an updated amount as a balance of a prepaid fee stored in one of the first and second storing means, the updating device including, means for selecting a balance of a prepaid fee stored in one of the first and second storing means to be updated, means for setting an amount to be added to a current balance of the selected balance, means for comparing a limit amount corresponding to the selected balance with the sum of the current balance of the selected balance and the amount to be added, and means for setting the sum as the updated amount when the comparing means has determined that the sum is less than the limit amount.

* * * * *